United States Patent
Li et al.

(10) Patent No.: US 11,627,063 B1
(45) Date of Patent: Apr. 11, 2023

(54) SYSTEMS AND METHODS FOR MEASURING UNIDIRECTIONAL LATENCY OF APPLICATIONS OVER ASYMMETRIC LINKS

(71) Applicant: Verizon Patent and Licensing Inc., Basking Ridge, NJ (US)

(72) Inventors: Feng Li, Lexington, MA (US); Zhou Zheng, Worcester, MA (US); Haim S. Ner, Fair Lawn, NJ (US); Jerry James Schropp, Plainfield, IL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/540,875

(22) Filed: Dec. 2, 2021

(51) Int. Cl.
*H04L 43/0852* (2022.01)
*H04L 43/0864* (2022.01)

(52) U.S. Cl.
CPC ...... *H04L 43/0858* (2013.01); *H04L 43/0864* (2013.01)

(58) Field of Classification Search
CPC ............ H04L 43/0858; H04L 43/0864; H04L 43/087; H04L 43/0888; H04L 43/10; H04L 43/106; H04L 43/12; H04L 47/283
USPC .................................................. 709/224, 223
See application file for complete search history.

(56) References Cited

U.S. PATENT DOCUMENTS

| | | | | |
|---|---|---|---|---|
| 6,640,248 B1 * | 10/2003 | Jorgensen | ......... | H04W 28/0273 370/328 |
| 8,583,820 B2 * | 11/2013 | Harrang | ................. | H04L 1/1671 709/224 |
| 9,774,401 B1 * | 9/2017 | Borrill | .................. | H04L 9/0852 |
| 2004/0228284 A1 * | 11/2004 | Tuinstra | .............. | H04L 41/5009 370/252 |
| 2009/0276542 A1 * | 11/2009 | Aweya | ...................... | H03L 7/08 709/248 |
| 2010/0085989 A1 * | 4/2010 | Belhadj | ................. | H04J 3/0667 370/503 |
| 2010/0085990 A1 * | 4/2010 | Belhadj | ................. | H04J 3/0667 370/517 |
| 2010/0274872 A1 * | 10/2010 | Harrang | ................ | H04L 1/0002 709/217 |
| 2013/0159724 A1 * | 6/2013 | Kim | ...................... | H04L 9/0866 713/168 |
| 2014/0149526 A1 * | 5/2014 | Magee | ................ | H04L 43/0864 709/208 |
| 2017/0041750 A1 * | 2/2017 | Jose | .......................... | G01S 5/10 |
| 2017/0155590 A1 * | 6/2017 | Dillon | ................. | H04L 43/0852 |
| 2017/0207976 A1 * | 7/2017 | Rovner | ................... | H04L 45/54 |
| 2018/0062919 A1 * | 3/2018 | Justin | .................. | H04L 41/0803 |
| 2018/0294941 A1 * | 10/2018 | Chapman | ............... | H04B 3/487 |
| 2018/0359811 A1 * | 12/2018 | Verzun | .................. | H04W 28/12 |

(Continued)

OTHER PUBLICATIONS

Shalunov et al., "A One-way Active Measurement Protocol (OWAMP)," Network Working Group, Sep. 2006, 56 Pages.

*Primary Examiner* — Thu Ha T Nguyen

(57) ABSTRACT

A user device may measure unidirectional latency of applications over asymmetric links. The user device may accurately measure application level unidirectional latency over cellular networks, without synchronizing system clocks. The user device may accurately measure the unidirectional latency in both an uplink direction and a downlink direction, without using a high-precision system clock and without synchronizing clocks between the user device and an application server.

20 Claims, 10 Drawing Sheets

(56) References Cited

U.S. PATENT DOCUMENTS

| | | | |
|---|---|---|---|
| 2019/0158371 A1* | 5/2019 | Dillon | H04L 43/087 |
| 2019/0215729 A1* | 7/2019 | Oyman | H04L 65/1016 |
| 2019/0285722 A1* | 9/2019 | Markhovsky | G01S 1/042 |
| 2019/0349426 A1* | 11/2019 | Smith | H04L 9/0825 |
| 2019/0363843 A1* | 11/2019 | Gordaychik | H04W 52/58 |
| 2020/0120482 A1* | 4/2020 | Parkvall | H04W 8/18 |
| 2020/0182959 A1* | 6/2020 | Markhovsky | G01S 5/12 |
| 2020/0259896 A1* | 8/2020 | Sachs | H04L 63/0823 |
| 2021/0144517 A1* | 5/2021 | Guim Bernat | H04L 9/0637 |
| 2022/0052954 A1* | 2/2022 | Leung | H04L 67/131 |
| 2022/0078099 A1* | 3/2022 | Zhohov | H04L 41/14 |
| 2022/0086822 A1* | 3/2022 | Bao | H04W 72/048 |
| 2022/0141784 A1* | 5/2022 | Singh | H04W 56/0015 370/350 |
| 2022/0171648 A1* | 6/2022 | Rodriguez | G06F 9/45533 |
| 2022/0393863 A1* | 12/2022 | Borrill | H04L 9/0852 |

* cited by examiner

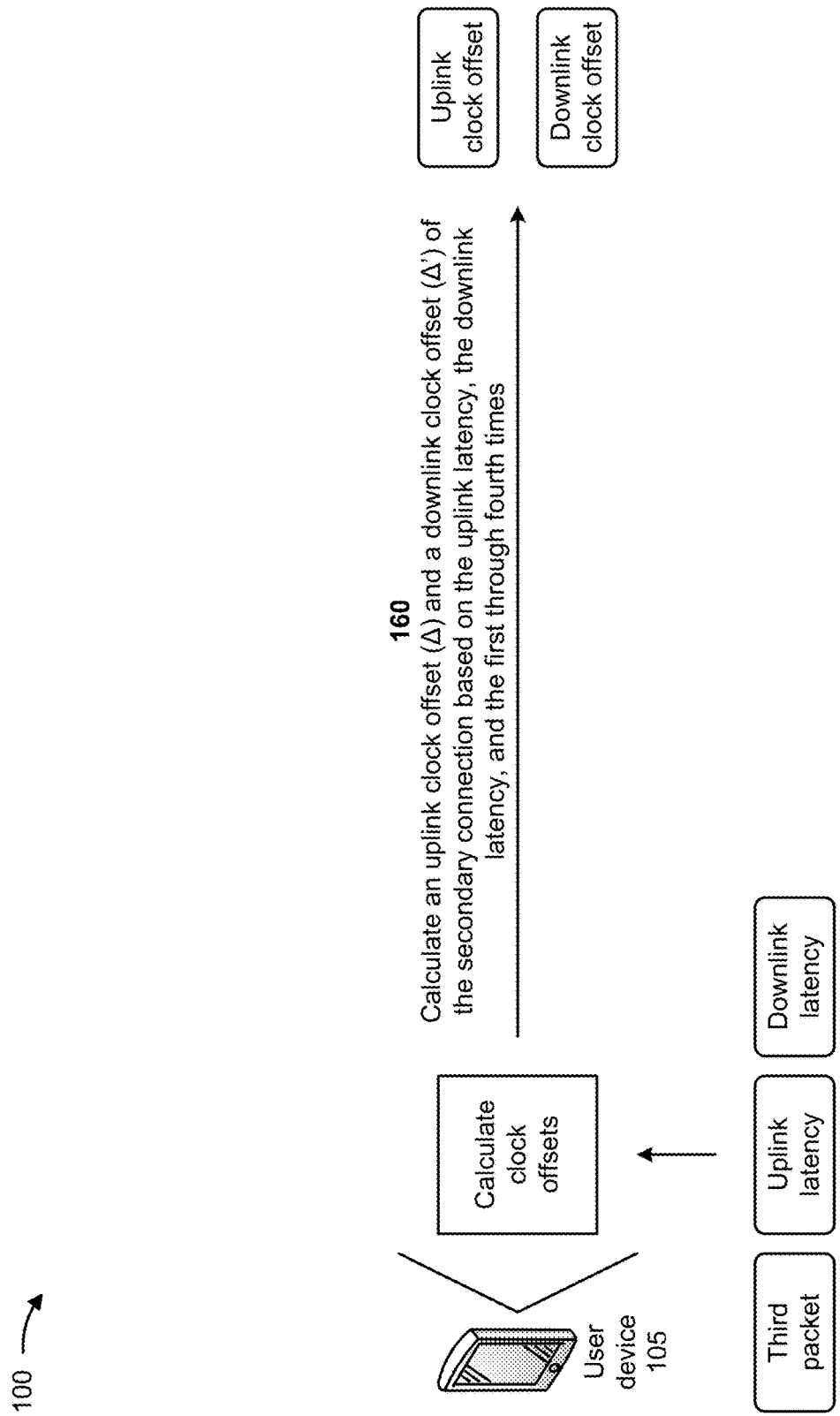

SYSTEMS AND METHODS FOR MEASURING UNIDIRECTIONAL LATENCY OF APPLICATIONS OVER ASYMMETRIC LINKS

BACKGROUND

One way or unidirectional delay and unidirectional delay variation (e.g., jitter) measurements are becoming increasing important as these key performance indicators (KPIs) are used to ensure a quality of service (QoS) of real-time applications, such as voice-over-Internet protocol (VoIP) applications, interactive video applications, gaming applications, and/or the like. For example, a typical service level agreement (SLA) specification of multimedia applications over fifth generation (5G) networks is as stringent as wireline requirements (e.g., unidirectional jitter less than five milliseconds and end-to-end latency in a range of three to ten milliseconds).

BRIEF DESCRIPTION OF THE DRAWINGS

FIGS. 1A-1G are diagrams of an example associated with measuring unidirectional latency of applications over asymmetric links.

DETAILED DESCRIPTION OF EXAMPLE EMBODIMENTS

Figure 1A:
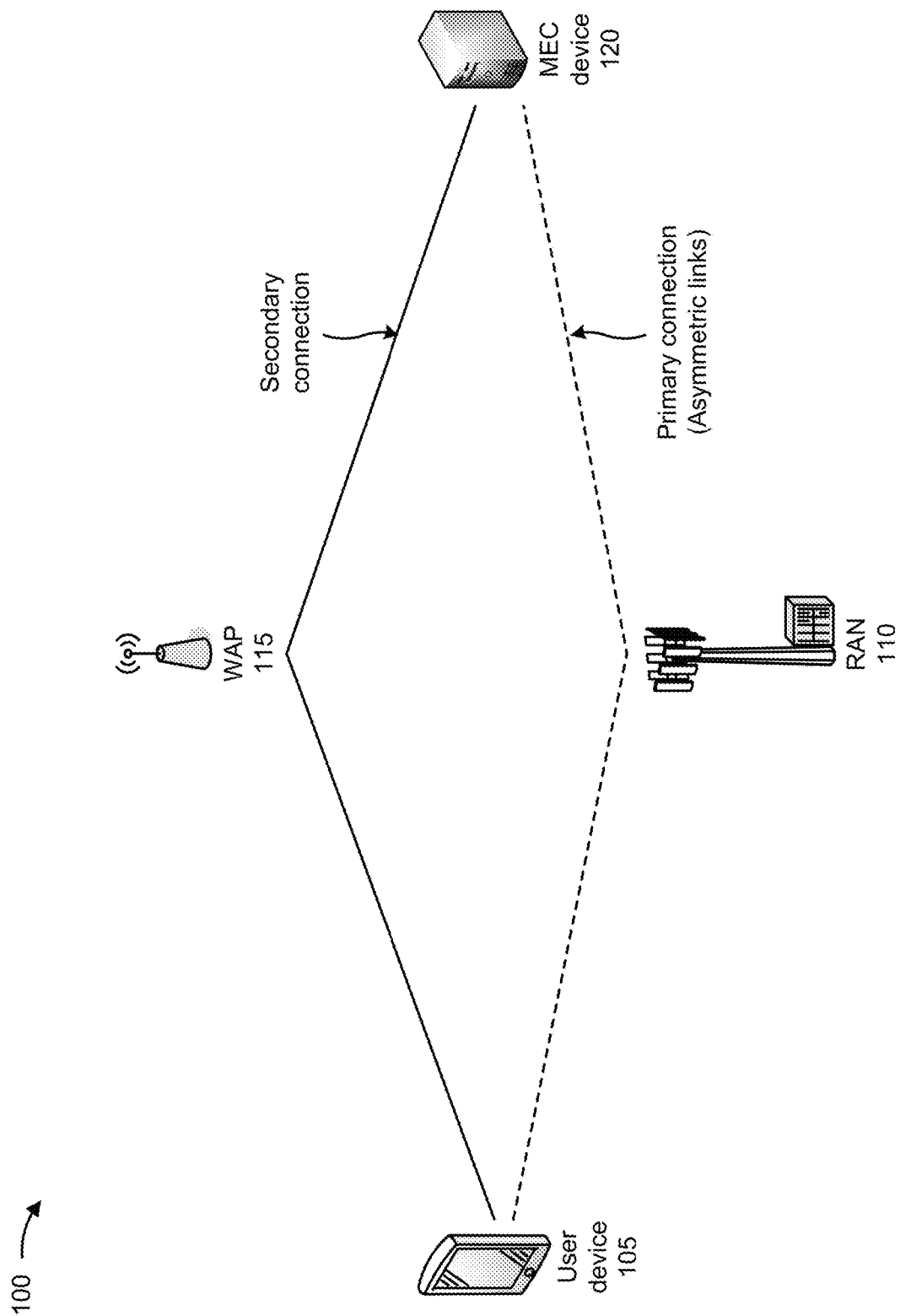

The following detailed description of example implementations refers to the accompanying drawings. The same reference numbers in different drawings may identify the same or similar elements.

Mobile Internet service providers (ISPs) are increasingly turning to one way latency measurement to assure that a network meets SLA requirements, since legacy round trip delay metrics generally fail to identify QoS issues in an asymmetric access network (e.g., a cellular network where downlink speeds exceed uplink speeds). A round trip latency measurement provides an aggregated latency over a send and receive path, identifies false unidirectional issues, and exacerbates troubleshooting efforts. In contrast, one way latency measurement can be used to quickly identify QoS issues.

One way latency and jitter can be measured by sending a precisely timestamped test packet through a network. When a sending device transmits a test packet to a receiving device, the sending device may add a sent timestamp ($TS_s$), for the sending device's system clock, to the test packet. When the receiving device receives the test packet, the receiving device may determine a receiving timestamp ($TS_r$) based on the receiving device's system clock. A gross unidirectional latency (L') from the sending device to the receiving device may be calculated as follows: $L' = TS_r - TS_s = (TS_s + \Delta) + L - TS_s = L + \Delta$. Since the sent timestamp ($TS_s$) and the receiving timestamp ($TS_r$) are measured from two different clocks, a measured gross unidirectional latency (L) includes an actual unidirectional latency (L) from the sending device to the receiving device and a clock offset (A) between the two clocks.

Because of the clock offset, current methods for measuring unidirectional latency require clock synchronization with a high precision clock device (e.g., a global positioning system (GPS) clock) or a clock service (e.g., a network time protocol (NTP) service) prior to unidirectional latency measurements, especially when the actual unidirectional latency is small (e.g., in milliseconds). However, clock drift may eventually yield a small clock offset in a short time period even after synchronizing the clocks. Additionally, synchronizing clocks is not a trivial task, especially over cellular networks. In cellular networks, an application server may operate as a virtualized container within an ISP's private cloud (e.g., a mobile edge computing (MEC) data center). It is difficult to utilize a GPS clock with a physical server that hosts the virtualized application server, and adjusting a system clock requires administrator privileges.

Thus, current methods for measuring unidirectional latency consume computing resources (e.g., processing resources, memory resources, communication resources, and/or the like), networking resources, and/or other resources associated with incorrectly measuring unidirectional latency for a mobile network, handling poor QoS experiences for users of the mobile network based on the incorrectly measured unidirectional latency, correcting the incorrectly measured unidirectional latency for the mobile network, and/or the like.

Some implementations described herein provide a user device that measures unidirectional latency of applications over asymmetric links. For example, the user device may provide a first packet at a first time to an application server via a secondary connection, and may receive, from the application server and via the secondary connection, a second packet that includes information identifying the first time, a second time when the first packet is received by the application server, and a third time when the second packet is transmitted by the application server. The user device may calculate a round trip time of the secondary connection based on the first through third times and a fourth time when the second packet is received by the user device, and may calculate an uplink unidirectional latency and a downlink unidirectional latency of the secondary connection based on the round trip time. The user device may calculate an uplink clock offset and a downlink clock offset of the secondary connection based on the uplink unidirectional latency, the downlink unidirectional latency, and the first through fourth times, and may provide a third packet, with the uplink clock offset and the downlink clock offset and at a fifth time, to the application server via a primary connection. The user device may receive, from the application server and via the primary connection, a fourth packet that includes information identifying the fifth time, a sixth time when the third packet is received by the application server, and a seventh time when the fourth packet is transmitted by the application server, and may calculate an uplink unidirectional latency and a downlink unidirectional latency of the primary connection based on the uplink clock offset and the downlink clock offset of the secondary connection and based on the fifth through seventh times and an eighth time when the fourth packet is received by the user device.

In this way, the user device measures unidirectional latency of applications over asymmetric links. For example, the user device may accurately measure application level unidirectional latency over cellular networks, without synchronizing system clocks. The user device may accurately measure the unidirectional latency in both an uplink direction and a downlink direction, without using a high-precision system clock (e.g., GPS signal) and without synchronizing clocks between the user device and an application server. Thus, the user device may conserve computing resources, networking resources, and/or other resources that would have otherwise been consumed by incorrectly measuring unidirectional latency for a mobile network, handling poor QoS experiences for users of the mobile network based on the incorrectly measured unidirectional latency, correcting the incorrectly measured unidirectional latency for the mobile network, and/or the like.

FIGS. 1A-1G are diagrams of an example 100 associated with measuring unidirectional latency of applications over asymmetric links. As shown in FIGS. 1A-1G, example 100 includes a user device 105 associated with a radio access network (RAN) 110, a wireless access point (WAP) 115, and an MEC device 120 (e.g., an application server providing an application). Further details of the user device 105, the RAN 110, the WAP 115, and the MEC device 120 are provided elsewhere herein. Although implementations described herein relate to the user device 105, the implementations may also be performed by the MEC device 120 in conjunction with the user device 105.

As shown in FIG. 1A, the user device 105 and the MEC device 120 may be connected via a primary connection provided via the RAN 110. The primary connection may include a cellular network (e.g., a 5G network or a long term evolution (LTE) network) connection with asymmetric links. As further shown in FIG. 1A, the user device 105 and the MEC device 120 may be connected via a secondary connection provided via the WAP 115. The user device 105 may be equipped with multiple network interface types, other than a cellular adapter, so that the user device 105 may communicate with the secondary connection. Different from the cellular network asymmetric links, the secondary connection (e.g., a Wi-Fi connection, an Ethernet connection, a Bluetooth connection, and/or the like) may include wireless links with similar capacity or the same capacity in both the uplink direction and the downlink direction. In the cellular links, the downlink direction capacity is much larger than the uplink direction capacity due to a licensed wireless radio spectrum of the RAN 110.

In some implementations, the user device 105 may measure a unidirectional latency over the primary connection between the user device 105 and the MEC device 120 by estimating clock offsets over the secondary connection. The user device 105 may utilize the estimated clock offsets to measure unidirectional latencies over the asymmetric links of the primary connection. Such a procedure does not require clock synchronization between the user device 105 and the MEC device 120 before the measurement of the unidirectional latencies. The user device 105 may estimate the clock offsets between the user device 105 and the MEC device 120 based on a round trip measurement of the secondary connection, and may adjust a measured gross unidirectional latency of the primary connection, based on the round trip measurement, to calculate an accurate unidirectional latency of the primary connection.

Figure 1B:
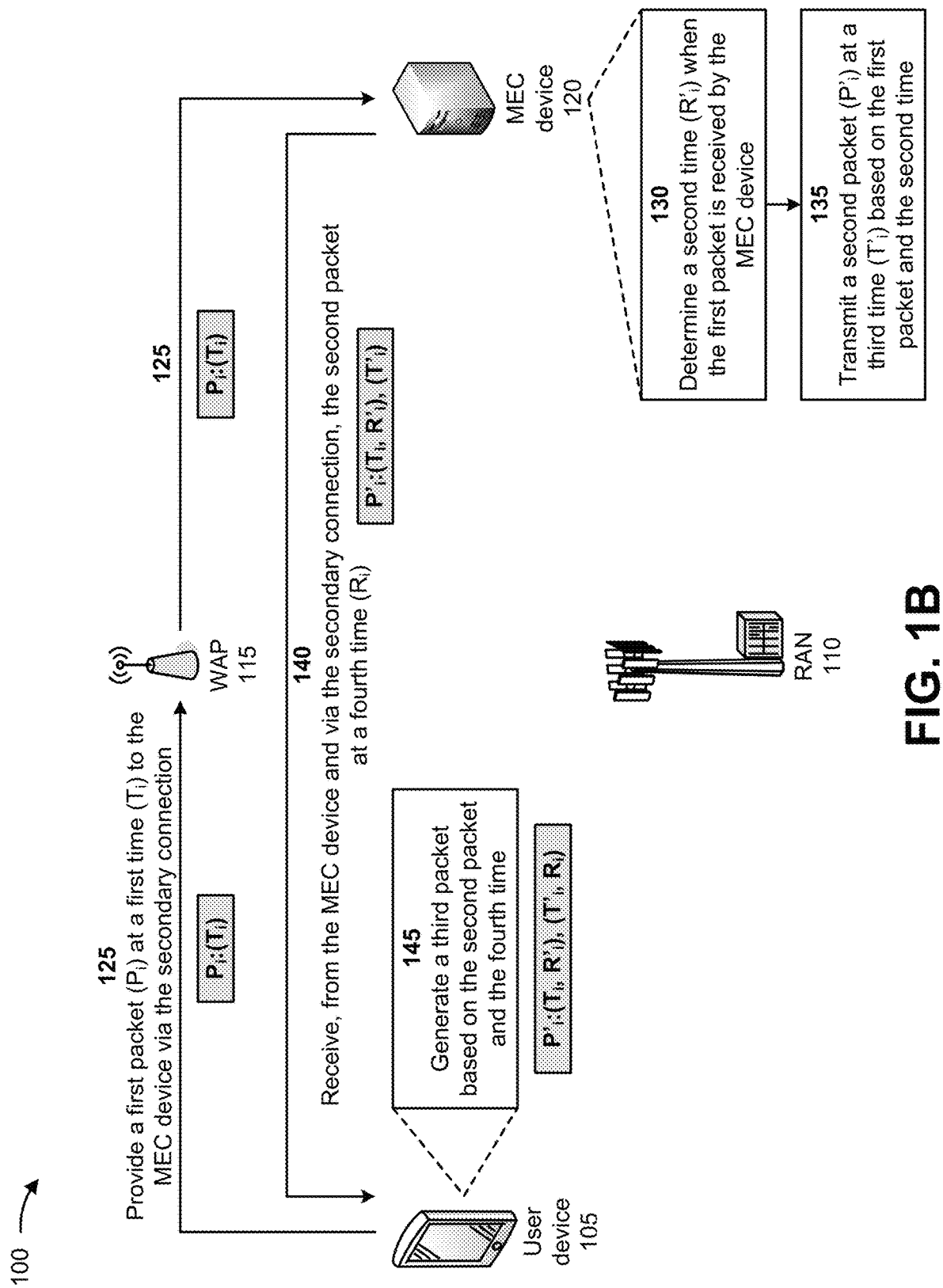

As shown in FIG. 1B, and by reference number 125, the user device 105 may provide a first packet ($P_i$) at a first time ($T_i$) to the MEC device 120 via the secondary connection. For example, the user device 105 may generate the first packet and may provide the first packet to the MEC device 120 at the first time. Payload content of the first packet may include a first timestamp identifying the first time. The user device 105 may utilize a local system clock of the user device 105 to measure the first time.

As further shown in FIG. 1B, and by reference number 130, the MEC device 120 may determine a second time ($R'_i$) when the first packet is received by the MEC device 120. For example, when the MEC device 120 receives the first packet, the MEC device 120 may utilize a local system clock to identify the second time when the first packet is received by the MEC device 120. The MEC device 120 may generate a second timestamp identifying the second time, and may combine the first timestamp and the second timestamp to form a first timestamp tuple (e.g., $T_i$, $R'_i$).

As further shown in FIG. 1B, and by reference number 135, the MEC device 120 may transmit a second packet (P's) at a third time ($T'_i$) based on the first packet and the second time. For example, the MEC device 120 may generate the second packet based on the first packet, and may provide the second packet to the user device 105 at the third time. Payload content of the second packet may include the first timestamp tuple (e.g., with the first timestamp and the second timestamp, $T_i$, $R'_i$) and a third timestamp identifying the third time. The MEC device 120 may utilize the third timestamp to form a second timestamp tuple (e.g., $T'_i$). The MEC device 120 may utilize the local system clock of the MEC device 120 to measure the third time.

As further shown in FIG. 1B, and by reference number 140, the user device 105 may receive, from the MEC device 120 and via the secondary connection, the second packet at a fourth time ($R_i$). For example, when the user device 105 receives the second packet, the user device 105 may utilize the local system clock to identify the fourth time when the second packet is received by the user device 105. The user device 105 may generate a fourth timestamp identifying the fourth time, and may update the second timestamp tuple to include the fourth timestamp with the third timestamp (e.g., $T'_i$, $R_i$). When the user device 105 receives the second packet from the MEC device 120, the user device 105 has enough information (e.g., the first timestamp tuple and the second timestamp tuple) to estimate a clock offset.

As further shown in FIG. 1B, and by reference number 145, the user device 105 may generate a third packet based on the second packet and the fourth time. For example, the user device 105 may generate the third packet based on the second packet and the fourth time associated with when the second packet is received by the user device 105. Payload content of the third packet may include the first timestamp tuple (e.g., with the first timestamp and the second timestamp, $T_i$, $R'_i$) and the second timestamp tuple (e.g., with the third timestamp and the fourth timestamp, $T'_i$, $R_i$). The user device 105 may utilize the local system clock of the user device 105 to measure the fourth time.

Figure 1C:
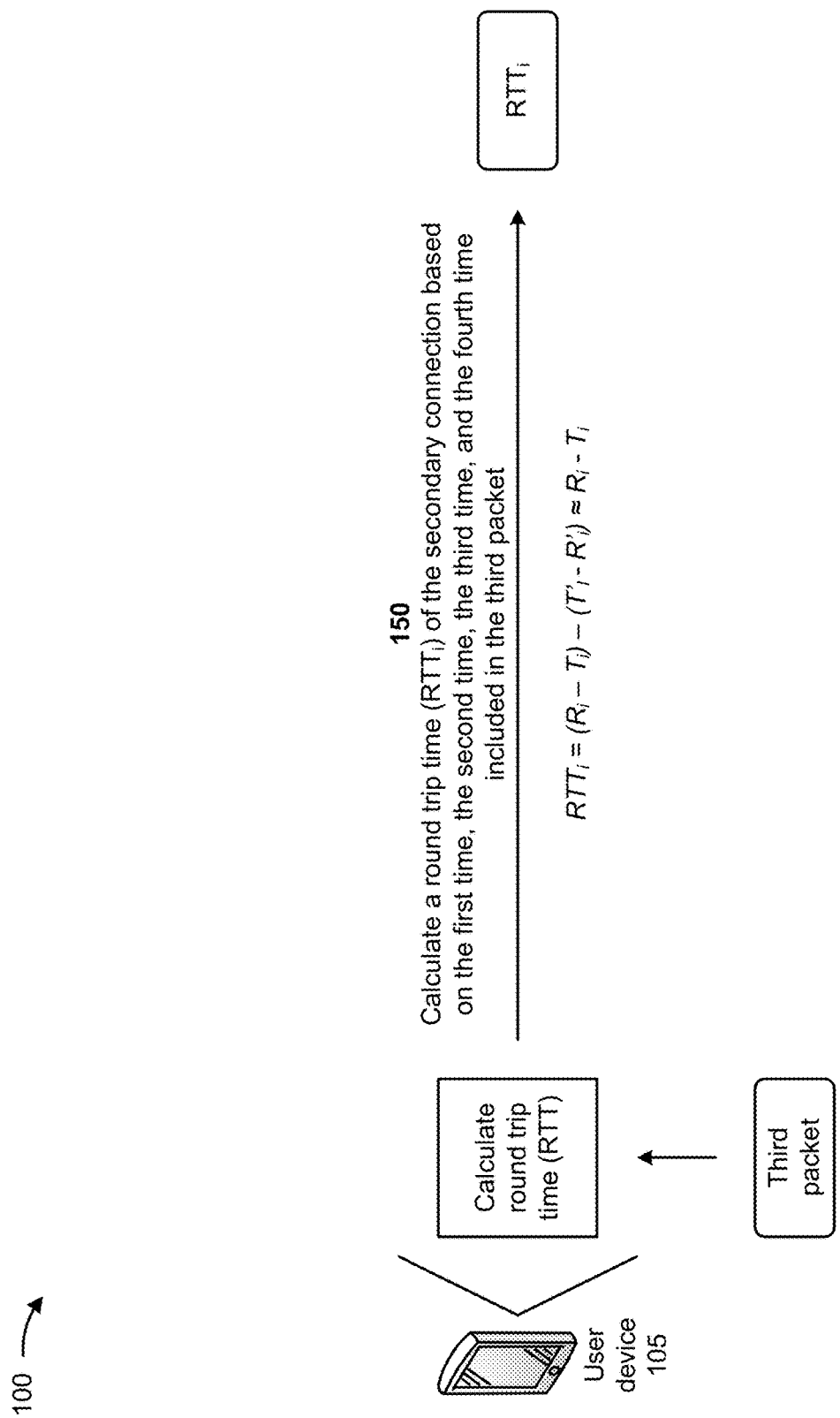

As shown in FIG. 1C, and by reference number 150, the user device 105 may calculate a round trip time ($RTT_i$) of the secondary connection based on the first time, the second time, the third time, and the fourth time included in the third packet. For example, the user device 105 may calculate the round trip time ($RTT_i$) of the secondary connection based on the first time ($T_i$), the second time ($R'_i$), the third time ($T'_i$), and the fourth time ($R_i$), as follows:

$$RTT_i = (R_i - T_i) - (T'_i - R'_i) \approx R_i - T_i,$$

where $T'_i - R'_i$ may correspond to a processing time of the MEC device 120 (e.g., to receive the first packet and transmit the second packet), which may be substantially equivalent to zero since the second time (R') may substantially equal the third time ($T_i$).

Figure 1D:
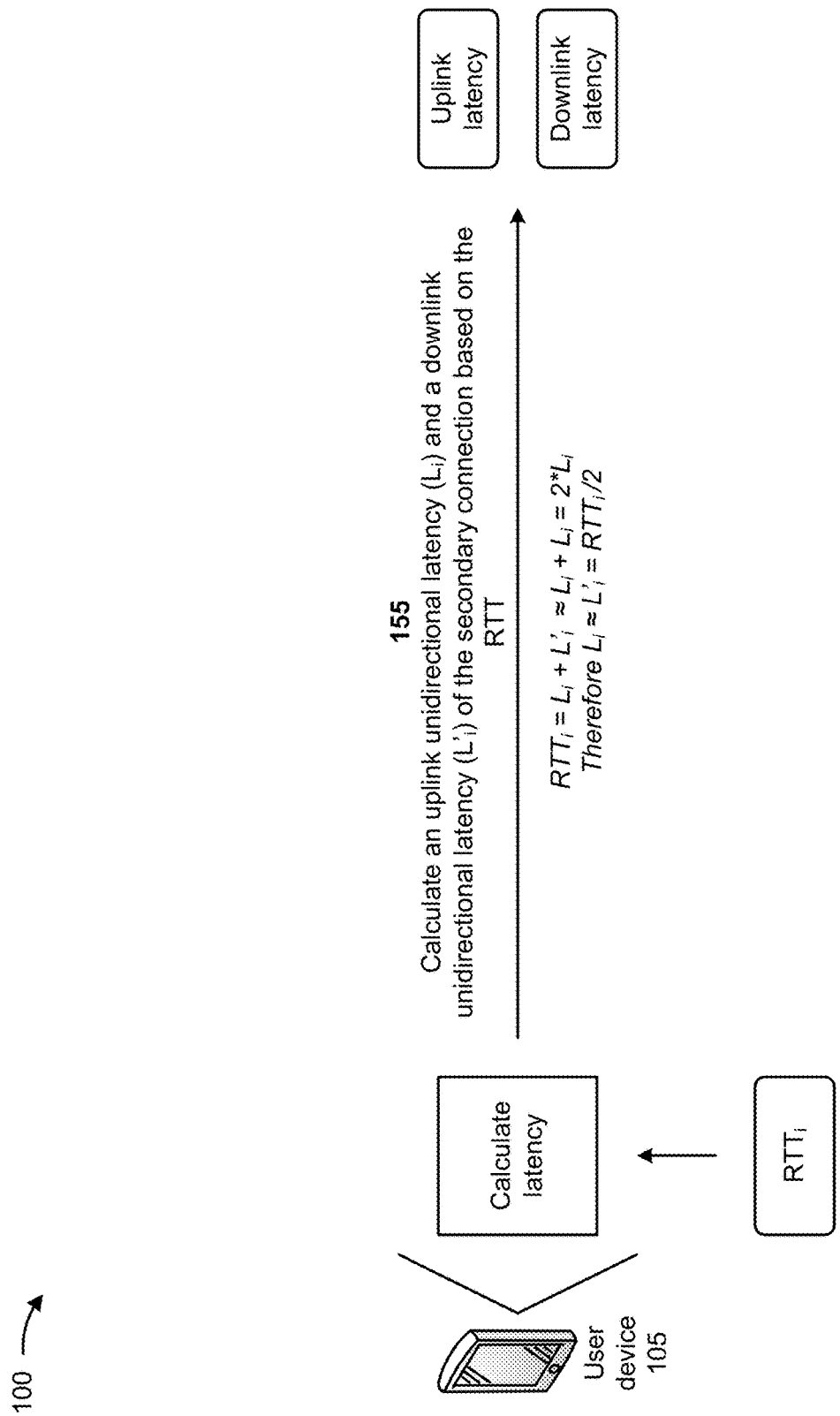

As shown in FIG. 1D, and by reference number 155, the user device 105 may calculate an uplink unidirectional latency (L) and a downlink unidirectional latency (L'1) of the secondary connection based on the round trip time. For example, because the secondary connection is symmetric, the user device 105 may determine that the uplink unidirectional latency ($L_i$) is the same as the downlink unidirectional latency ($L'_i$). Therefore, the user device 105 may calculate the uplink unidirectional latency (L) and the downlink unidirectional latency ($L'_i$) as follows:

$$RTT_i = L_i + L'_i \approx L_i + L_i = 2*L_i, \text{ and}$$

$$L_i \approx L'_i = \frac{RTT_i}{2}.$$

As shown in FIG. 1E, and by reference number 160, the user device 105 may calculate an uplink clock offset ($\Delta$) and a downlink clock offset ($\Delta'$) of the secondary connection based on the uplink latency, the downlink latency, and the first through fourth times. For example, with the first timestamp tuple (e.g., identifying the first time ($T_i$) and the second time ($R'_i$)) and the second timestamp tuple (e.g., identifying the third time ($T'_i$) and the fourth time ($R_i$)), the user device 105 may calculate an uplink clock offset ($\Delta_i$) and a downlink clock offset ($\Delta'_i$) of the secondary connection as follows:

$$\Delta_i = R'_i - T_i - L_i = R'_i - T_i - \frac{RTT_i}{2},$$

and $$\Delta'_i = R_i - T'_i - L'_i = R_i - T'_i - \frac{RTT_i}{2}.$$

The clock offset ($\Delta_i$) may correspond to a clock offset between the MEC device 120 and the user device 105 that is used for uplink unidirectional latency measurement. The clock offset (A) may represent a clock offset between the user device 105 and the MEC device 120 that is used for downlink unidirectional latency measurement. In some implementations, the sum of the uplink clock offset and the downlink clock offset may be approximately zero (e.g., $\Delta_i + \Delta'_i \approx 0$).

In some implementations, in order to minimize any round trip time measurement error on the calculation of the clock offsets, the user device 105 may repeat the providing of the first packet, the receiving of the second packet, and the generating of the third packet for a predetermined quantity of iterations (n), and may utilize an average of n estimated clock offset samples for unidirectional latency measurement of the primary connection. The user device 105 may calculate the uplink clock offset (A) (e.g., the user device 105 to the MEC device 120) and the downlink clock offset ($\Delta'$) (e.g., the MEC device 120 to the user device 105) of the secondary connection, as follows:

$$\Delta = \frac{\sum_{i=1}^{n} \Delta_i}{n},$$

and $$\Delta' = \frac{\sum_{i=1}^{n} \Delta'_i}{n}.$$

In some implementations, a large quantity of test iterations n may significantly reduce random errors introduced to the round trip time measurement. In some implementations, the predetermined quantity of iterations n may be in a range from approximately five (5) and five-hundred (500). In some implementations, in addition to a mean of the clock offsets, the user device 105 may utilize a moving average or a standard deviation of the clock offsets.

Figure 1F:
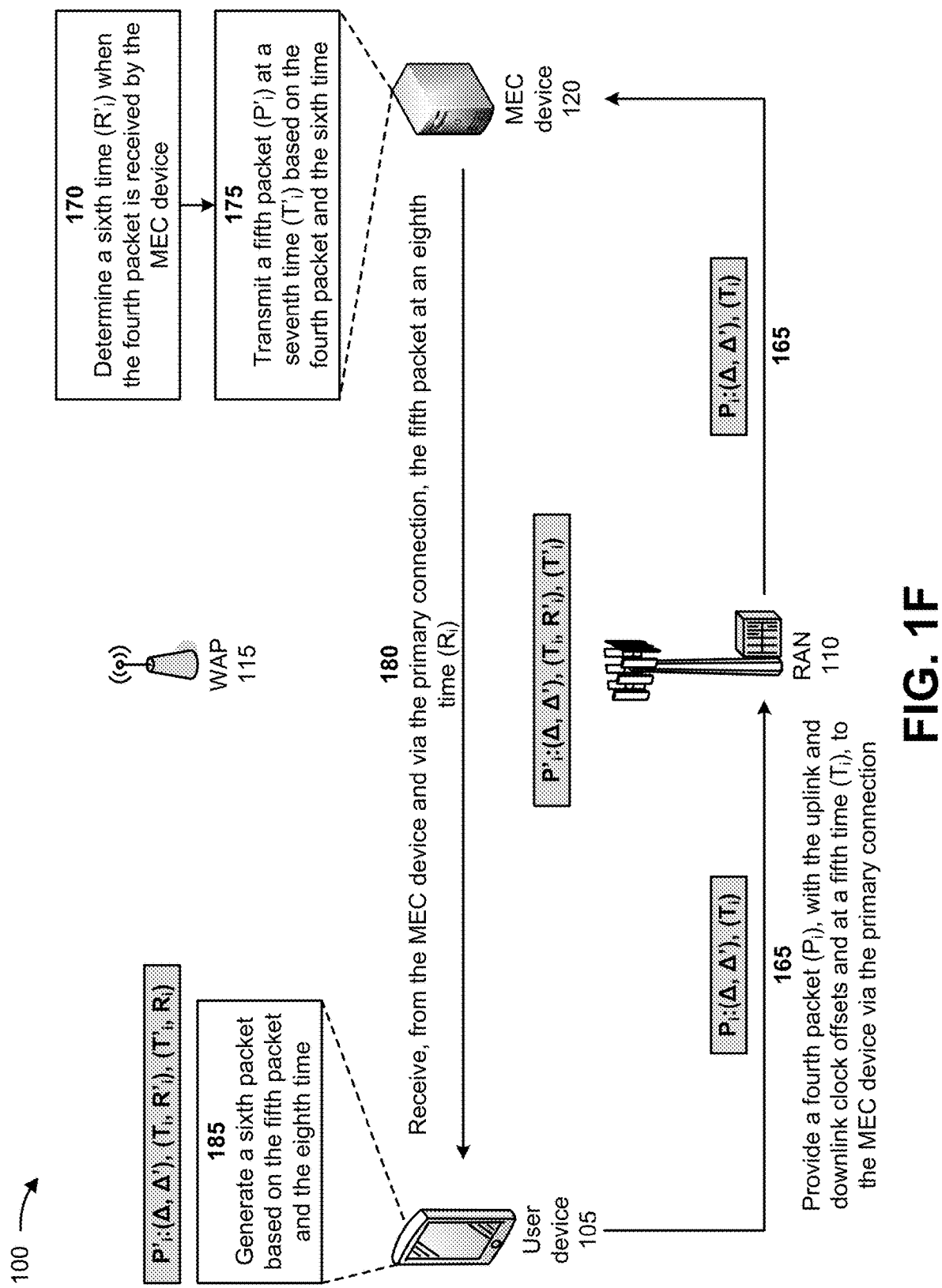

As shown in FIG. 1F, and by reference number 165, the user device 105 may provide a fourth packet ($P_i$), with the uplink and downlink clock offsets and at a fifth time ($T_i$), to the MEC device 120 via the primary connection. For example, the user device 105 may generate the fourth packet and may provide the fourth packet to the MEC device 120 at the fifth time and via the primary connection. Payload content of the fifth packet may include a fifth timestamp identifying the fifth time. The user device 105 may utilize the local system clock of the user device 105 to measure the fifth time.

As further shown in FIG. 1F, and by reference number 170, the MEC device 120 may determine a sixth time (IV) when the fourth packet is received by the MEC device 120. For example, when the MEC device 120 receives the fourth packet, the MEC device 120 may utilize the local system clock to identify the sixth time when the fourth packet is received by the MEC device 120. The MEC device 120 may generate a sixth timestamp identifying the sixth time, and may combine the fifth timestamp and the sixth timestamp to form a third timestamp tuple (e.g., R'1).

As further shown in FIG. 1F, and by reference number 175, the MEC device 120 may transmit a fifth packet ($P'_i$) at a seventh time ($T'_i$) based on the fourth packet and the sixth time. For example, the MEC device 120 may generate the fifth packet based on the fourth packet, and may provide the fifth packet to the user device 105 at the seventh time. Payload content of the fifth packet may include the third timestamp tuple (e.g., with the fifth timestamp and the sixth timestamp, $T_i$, $R'_i$) and a seventh timestamp identifying the seventh time. The MEC device 120 may utilize the seventh timestamp to form a fourth timestamp tuple (e.g., $T'_i$). The MEC device 120 may utilize the local system clock of the MEC device 120 to measure the seventh time.

As further shown in FIG. 1F, and by reference number 180, the user device 105 may receive, from the MEC device 120 and via the primary connection, the fifth packet at an eighth time ($R_i$). For example, when the user device 105 receives the fifth packet, the user device 105 may utilize the local system clock to identify the eighth time when the fifth packet is received by the user device 105. The user device 105 may generate an eighth timestamp identifying the eighth time, and may update the fourth timestamp tuple to include the eighth timestamp with the seventh timestamp (e.g., $T'_i$, $R_i$). When the user device 105 receives the fifth packet from the MEC device 120, the user device 105 has enough information (e.g., the third timestamp tuple and the fourth timestamp tuple) to calculate a unidirectional latency in both the uplink direction and the downlink direction.

As further shown in FIG. 1F, and by reference number 185, the user device 105 may generate a sixth packet based on the fifth packet and the eighth time. For example, the user device 105 may generate the sixth packet based on the fifth packet and the eighth time associated with when the fifth packet is received by the user device 105. Payload content of the sixth packet may include the third timestamp tuple (e.g., with the fifth timestamp and the sixth timestamp, $T_i$, $R'_i$) and the fourth timestamp tuple (e.g., with the seventh timestamp and the eighth timestamp, $T'_i$, $R_i$). The user device 105 may utilize the local system clock of the user device 105 to measure the eighth time.

Figure 1G:
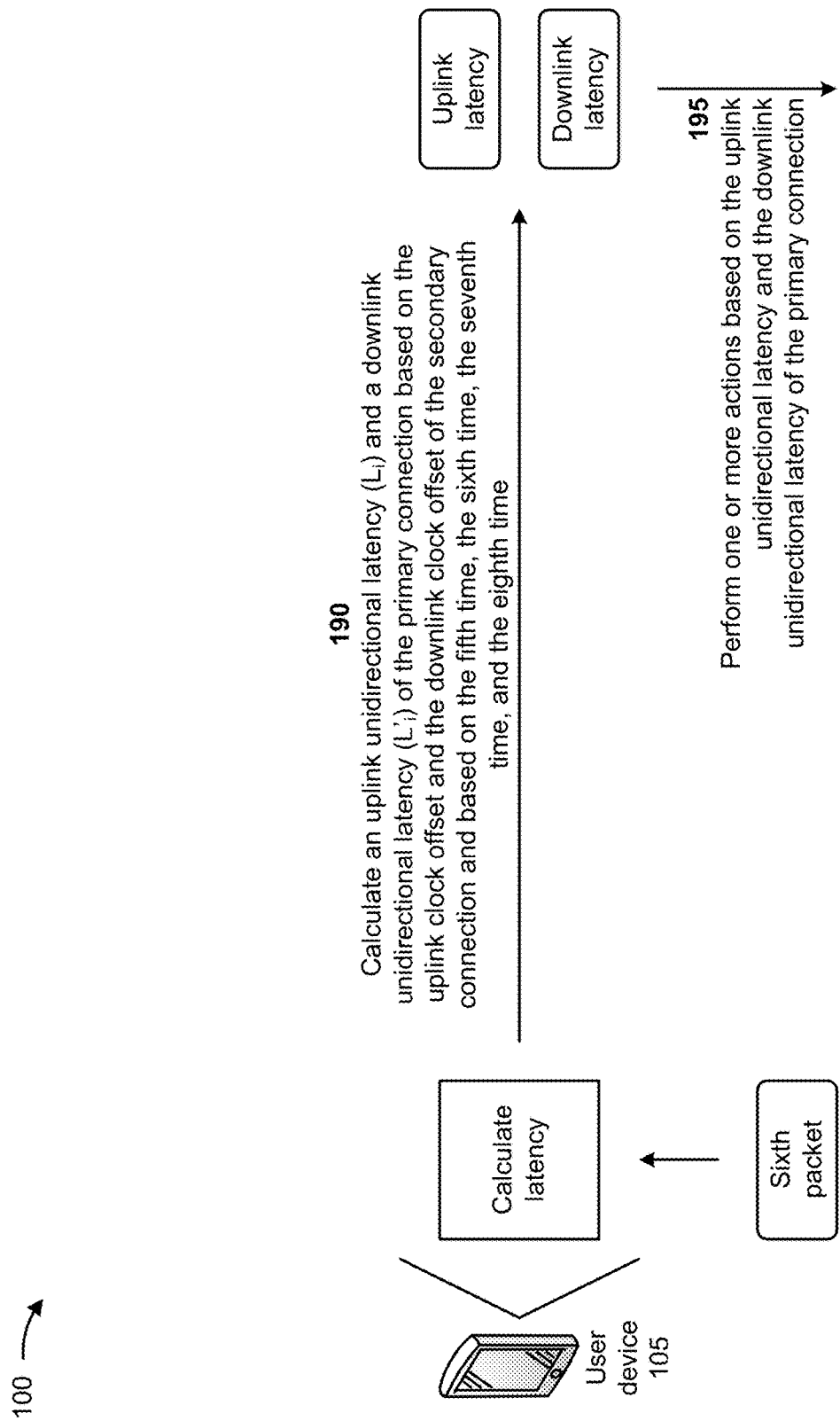

As shown in FIG. 1G, and by reference number 190, the user device 105 may calculate an uplink unidirectional latency ($L_i$) and a downlink unidirectional latency ($L'_i$) of the primary connection based on the uplink clock offset and the downlink clock offset of the secondary connection and based on the fifth time, the sixth time, the seventh time, and the eighth time. For example, the user device 105 may calculate the uplink unidirectional latency ($L_i$) as follows:

$$L_i = R'_i - T_i - \Delta,$$

where corresponds to the sixth time, $T_i$ corresponds to the fifth time, and $\Delta$ corresponds to the uplink clock offset. The user device 105 may calculate the downlink unidirectional latency ($L'_i$) as follows:

$$L'_i = R_i - T'_i - \Delta',$$

where $R_i$ corresponds to the eighth time, $T'_i$ corresponds to the seventh time, and $\Delta'$ corresponds to the downlink clock offset. In some implementations, the user device 105 may repeat the calculations of the uplink unidirectional latency and the downlink unidirectional latency to generate a mean of the latencies, which may reduce random errors introduced by the measurements. Multimedia applications received by the user device 105 (e.g., from the MEC device 120) may utilize the latency results to calculate jitter (e.g., latency variances). Furthermore, the user device 105 does not require administrator level privilege to adjust the system clock of the user device 105.

As further shown in FIG. 1G, and by reference number 195, the user device 105 may perform one or more actions based on the uplink unidirectional latency and the downlink unidirectional latency of the primary connection. In some implementations, performing the one or more actions may include the user device 105 providing the uplink unidirectional latency and the downlink unidirectional latency of the primary connection for display. For example, the user device 105 may display the uplink unidirectional latency and the downlink unidirectional latency to a network technician so that the network technician may identify any latency issues associated with the RAN 110. The technician may then take appropriate measures to address the latency issues. In this way, the user device 105 may conserve computing resources, networking resources, and/or other resources that would have otherwise been consumed by incorrectly measuring unidirectional latency for the RAN 110, handling poor QoS experiences for users of the RAN 110 based on the incorrectly measured unidirectional latency, correcting the incorrectly measured unidirectional latency for the RAN 110, and/or the like.

In some implementations, performing the one or more actions may include the user device 105 generating an alarm associated with the uplink unidirectional latency or the downlink unidirectional latency of the primary connection. For example, the user device 105 may generate an alarm associated with the uplink unidirectional latency and/or the downlink unidirectional latency to indicate latency issues associated with the RAN 110 to a network technician. The network technician may then take appropriate measures to address the latency issues associated with the RAN 110. In this way, the user device 105 may conserve computing resources, networking resources, and/or other resources that would have otherwise been consumed by handling poor QoS experiences for users of the RAN 110 based on the incorrectly measured unidirectional latency, and/or the like.

In some implementations, performing the one or more actions may include the user device 105 calculating jitter of the primary connection based on the uplink unidirectional latency and the downlink unidirectional latency of the primary connection. For example, the user device 105 may calculate the jitter of the primary connection based on variances in the uplink unidirectional latency and/or the downlink unidirectional latency of the primary connection. Multimedia applications received by the user device 105 may utilize the calculated jitter to determine how to best provide the multimedia applications to the user device 105. In this way, the user device 105 may conserve computing resources, networking resources, and/or other resources that would have otherwise been consumed by providing multimedia applications to the user device 105 without consideration of the jitter, handling poor QoS experiences for the user device 105 based on not considering the jitter, and/or the like.

In some implementations, performing the one or more actions may include the user device 105 determining that the uplink unidirectional latency of the primary connection fails to satisfy a latency threshold, and generating an alarm based on determining that the uplink unidirectional latency of the primary connection fails to satisfy the latency threshold. For example, the user device 105 may determine that an uplink latency issue exists with the RAN due to the uplink unidirectional latency of the primary connection failing to satisfy the latency threshold. The user device 105 may generate an alarm to indicate the uplink latency issue associated with the RAN 110 to a network technician. The network technician may then take appropriate measures to address the uplink latency issue associated with the RAN 110. In this way, the user device 105 may conserve computing resources, networking resources, and/or other resources that would have otherwise been consumed by handling poor QoS experiences for users of the RAN 110 based on the incorrectly measured unidirectional latency, and/or the like.

In some implementations, performing the one or more actions may include the user device 105 determining that the downlink unidirectional latency of the primary connection fails to satisfy a latency threshold, and generating an alarm based on determining that the downlink unidirectional latency of the primary connection fails to satisfy the latency threshold. For example, the user device 105 may determine that a downlink latency issue exists with the RAN due to the downlink unidirectional latency of the primary connection failing to satisfy the latency threshold. The user device 105 may generate an alarm to indicate the downlink latency issue associated with the RAN 110 to a network technician. The network technician may then take appropriate measures to address the downlink latency issue associated with the RAN 110. In this way, the user device 105 may conserve computing resources, networking resources, and/or other resources that would have otherwise been consumed by handling poor QoS experiences for users of the RAN 110 based on the incorrectly measured unidirectional latency, and/or the like.

In some implementations, performing the one or more actions may include the user device 105 allocating one or more additional resources for the primary connection based on the uplink unidirectional latency and the downlink unidirectional latency of the primary connection. For example, the user device 105 may determine that the uplink unidirectional latency or the downlink unidirectional latency requires one or more additional resources for a multimedia application received by the user device 105. The user device 105 may allocate the one or more additional resources, or may cause the RAN 110 to allocate the one or more additional resources, so that the multimedia application may correctly operate. In this way, the user device 105 may conserve computing resources, networking resources, and/or other resources that would have otherwise been consumed by providing the multimedia application to the user device 105 without the appropriate resources, handling poor QoS experiences for the user device 105 based on not allocating the appropriate resources, and/or the like.

In this way, the user device 105 measures unidirectional latency of applications over asymmetric links. For example, the user device 105 may accurately measure application level unidirectional latency over cellular networks, without synchronizing system clocks. The user device 105 may accurately measure the unidirectional latency in both an uplink direction and a downlink direction, without using a high-precision system clock (e.g., GPS signal) and without synchronizing clocks between the user device and an application server. Thus, the user device 105 may conserve computing resources, networking resources, and/or other resources that would have otherwise been consumed by incorrectly measuring unidirectional latency for a mobile network, handling poor QoS experiences for users of the mobile network based on the incorrectly measured unidirectional latency, correcting the incorrectly measured unidirectional latency for the mobile network, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
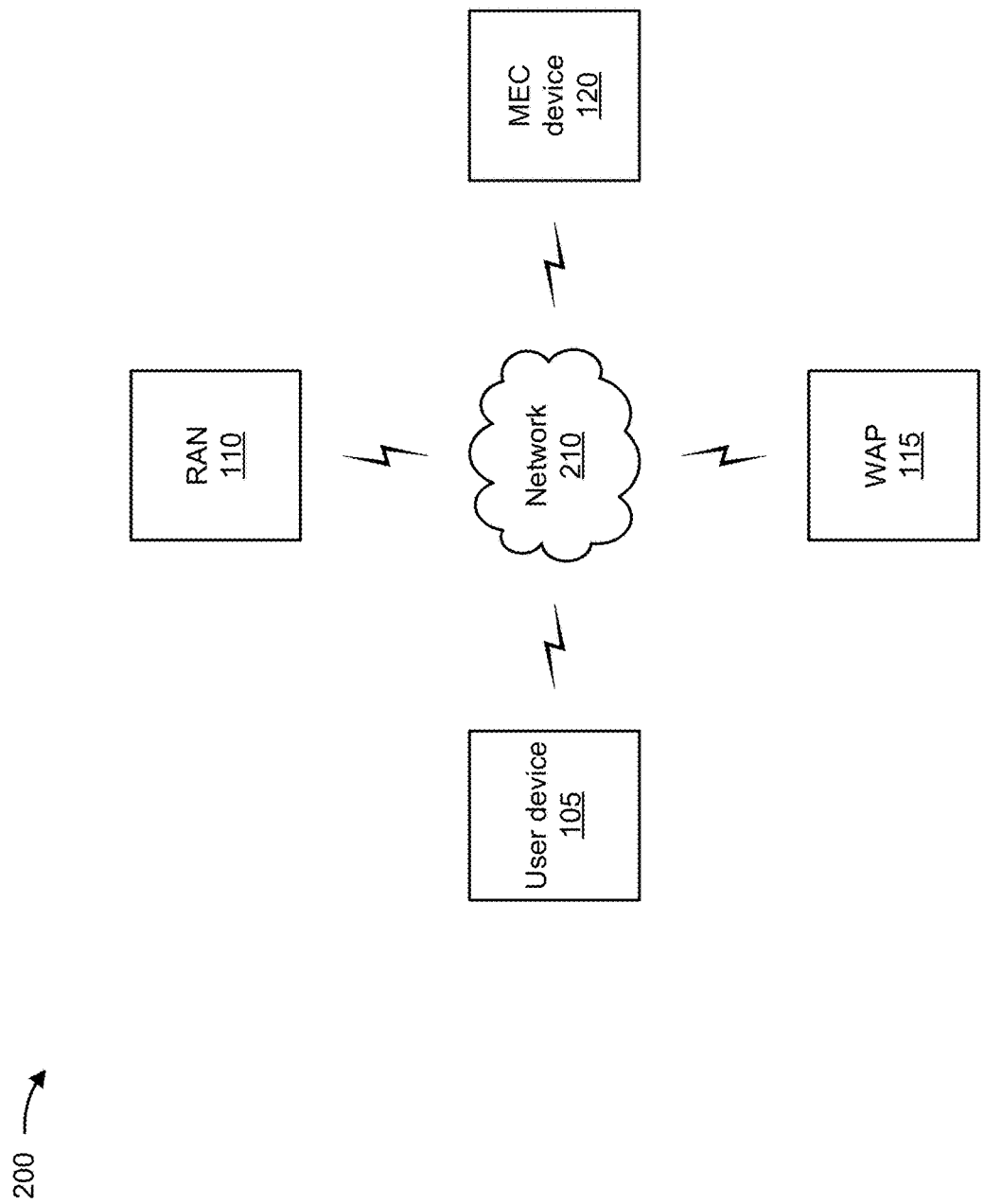
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include the user device 105, the RAN 110, the WAP 115, the MEC device 120, and a network 210. Devices of the environment 200 may interconnect via wired connections, wireless connections, or a combination of wired and wireless connections.

The user device 105 includes one or more devices capable of receiving, generating, storing, processing, and/or providing information, as described elsewhere herein. The user device 105 may include a communication device and/or a computing device. For example, the user device 105 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The RAN 110 may support, for example, a cellular radio access technology (RAT). The RAN 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that may support wireless communication for the user device 105. The RAN 110 may transfer traffic between the user device 105 (e.g., using a cellular RAT), one or more base stations (e.g., using a wireless interface or a backhaul interface, such as a wired backhaul interface), and/or a core network. The RAN 110 may provide one or more cells that cover geographic areas.

In some implementations, the RAN 110 may perform scheduling and/or resource management for the user device 105 covered by the RAN 110 (e.g., the user device 105 covered by a cell provided by the RAN 110). In some implementations, the RAN 110 may be controlled or coordinated by a network controller, which may perform load balancing, network-level configuration, and/or the like. The network controller may communicate with the RAN 110 via a wireless or wireline backhaul. In some implementations, the RAN 110 may include a network controller, a self-organizing network (SON) module or component, or a similar module or component. In other words, the RAN 110 may perform network control, scheduling, and/or network management functions (e.g., for uplink, downlink, and/or sidelink communications of the user device 105 covered by the RAN 110).

The WAP 115 includes one or more devices capable of receiving, generating, storing, processing, and/or providing information, such as information described herein. For example, the WAP 115 may include a networking hardware device that allows other wireless (e.g., Wi-Fi, Ethernet, Bluetooth, and/or the like) devices (e.g., the user device 105) to connect to a wired network. As a standalone device, the WAP 115 may include a wired connection to a router. In a wireless router, the WAP 115 may be an integral component of the wireless router itself.

The MEC device 120 includes one or more devices capable of receiving, generating, storing, processing, and/or providing information, such as information described herein. For example, the MEC device 120 may include a laptop computer, a tablet computer, a desktop computer, a group of server devices, a cloud-based device, or a similar type of device. In some implementations, the MEC device 120 may receive information from and/or transmit information to the user device 105, via the RAN 110, the WAP 115, and/or the network 210.

The network 210 includes one or more wired and/or wireless networks. For example, the network 210 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
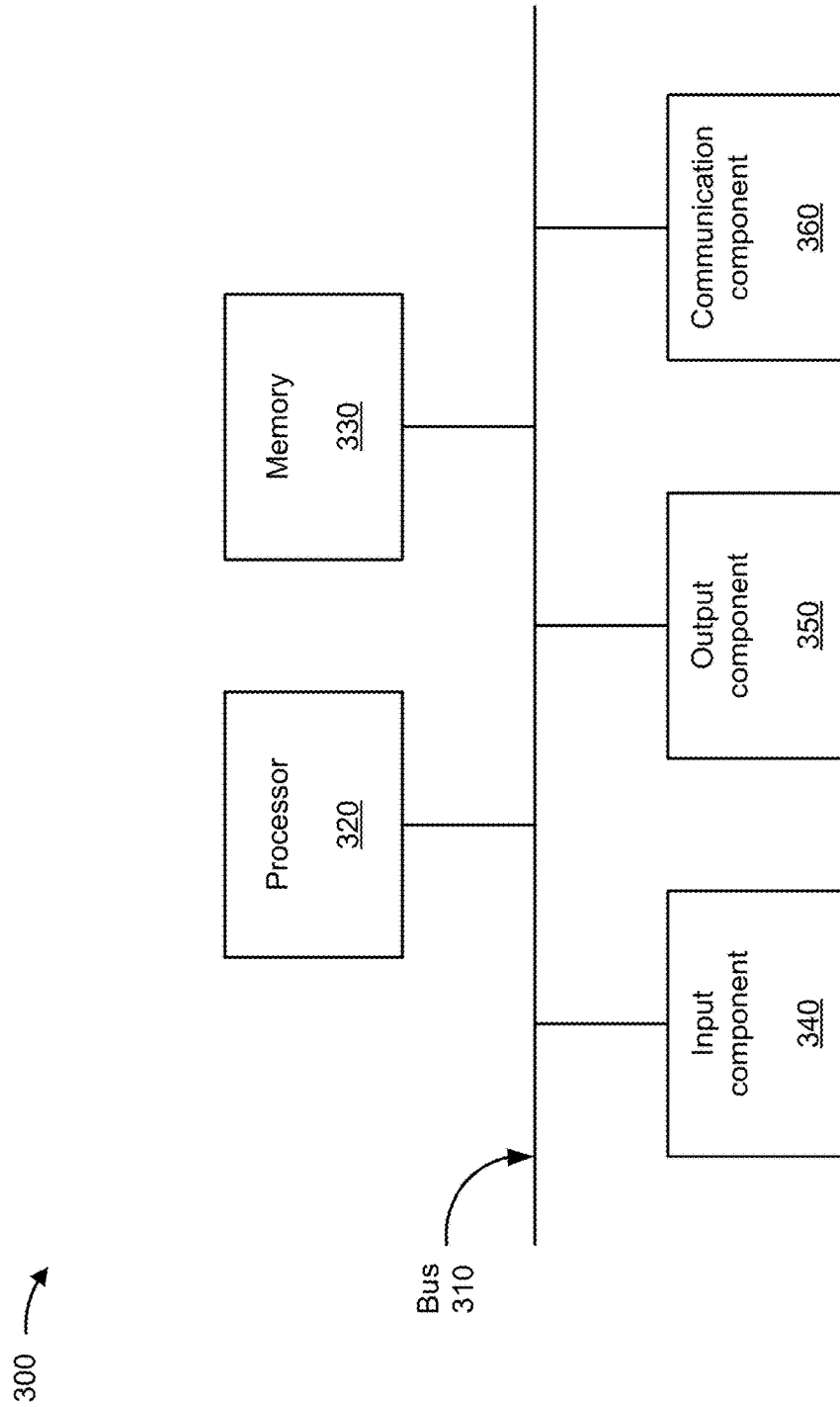
FIG. 3 is a diagram of example components of one or more devices of FIG. 3.

FIG. 3 is a diagram of example components of a device 300, which may correspond to the user device 105, the RAN 110, the WAP 115, and/or the MEC device 120. In some implementations, the user device 105, the RAN 110, the WAP 115, and/or the MEC device 120 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. Memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
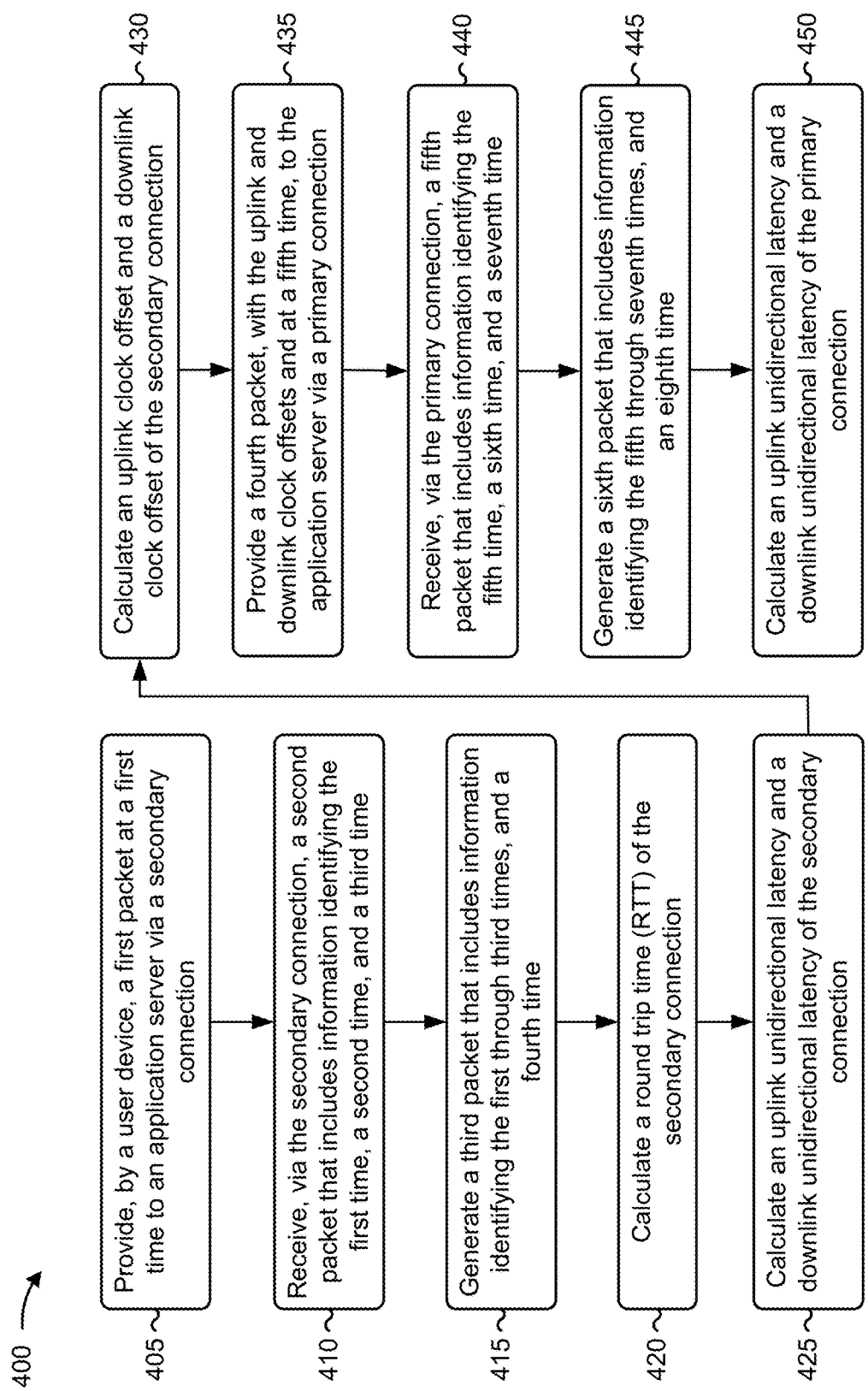
FIG. 4 is a flowchart of an example process for measuring unidirectional latency of applications over asymmetric links.

FIG. 4 is a flowchart of an example process 400 for measuring unidirectional latency of applications over asymmetric links. In some implementations, one or more process blocks of FIG. 4 may be performed by a device (e.g., the user device 105). In some implementations, one or more process blocks of FIG. 4 may be performed by another device or a group of devices separate from or including the device, such as an MEC device (e.g., the MEC device 120). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include providing a first packet at a first time to an application via a secondary connection (block 405). For example, the user device may provide a first packet at a first time to an application via a secondary connection, as described above. In some implementations, the application is configured to provide one or more multimedia applications to the user device. In some implementations, the application is provided by a mobile edge computing device.

As further shown in FIG. 4, process 400 may include receiving from the application, and via the secondary connection, a second packet that includes information identifying the first time, a second time when the first packet is received by the application, and a third time when the second packet is transmitted by the application (block 410). For example, the user device may receive from the application, and via the secondary connection, a second packet that includes information identifying the first time, a second time when the first packet is received by the application, and a third time when the second packet is transmitted by the application, as described above. In some implementations, the second time and the third time are substantially equivalent.

As further shown in FIG. 4, process 400 may include generating a third packet based on the second packet and including information identifying the first time, the second time, the third time, and a fourth time when the second packet is received by the user device (block 415). For example, the user device may generate a third packet based on the second packet and including information identifying the first time, the second time, the third time, and a fourth time when the second packet is received by the user device, as described above. In some implementations, the third packet includes a first timestamp tuple that includes the first time and the second time, and a second timestamp tuple that includes the third time and the fourth time.

As further shown in FIG. 4, process 400 may include calculating a round trip time of the secondary connection based on the first time, the second time, the third time, and the fourth time (block 420). For example, the user device may calculate a round trip time of the secondary connection based on the first time, the second time, the third time, and the fourth time, as described above. In some implementations, calculating the round trip time of the secondary connection includes subtracting the first time from the fourth time to obtain a first value, subtracting the second time from the third time to obtain a second value, and subtracting the second value from the first value to calculate the round trip time of the secondary connection.

As further shown in FIG. 4, process 400 may include calculating an uplink unidirectional latency and a downlink unidirectional latency of the secondary connection based on the round trip time (block 425). For example, the user device may calculate an uplink unidirectional latency and a downlink unidirectional latency of the secondary connection based on the round trip time, as described above.

As further shown in FIG. 4, process 400 may include calculating an uplink clock offset and a downlink clock offset of the secondary connection based on the uplink unidirectional latency of the secondary connection, the downlink unidirectional latency of the secondary connection, the first time, the second time, the third time, and the fourth time (block 430). For example, the user device may calculate an uplink clock offset and a downlink clock offset of the secondary connection based on the uplink unidirectional latency of the secondary connection, the downlink unidirectional latency of the secondary connection, the first time, the second time, the third time, and the fourth time, as described above.

As further shown in FIG. 4, process 400 may include providing a fourth packet, with the uplink clock offset and the downlink clock offset and at a fifth time, to the application via a primary connection (block 435). For example, the user device may provide a fourth packet, with the uplink clock offset and the downlink clock offset and at a fifth time, to the application via a primary connection, as described above. In some implementations, the primary connection includes a radio access network and the secondary connection includes a wireless access point.

As further shown in FIG. 4, process 400 may include receiving from the application, and via the primary connection, a fifth packet that includes information identifying the fifth time, a sixth time when the fourth packet is received by the application, and a seventh time when the fifth packet is transmitted by the application (block 440). For example, the user device may receive from the application, and via the primary connection, a fifth packet that includes information identifying the fifth time, a sixth time when the fourth packet is received by the application, and a seventh time when the fifth packet is transmitted by the application, as described above.

As further shown in FIG. 4, process 400 may include generating a sixth packet based on the fifth packet and including information identifying the fifth time, the sixth time, the seventh time, and an eighth time when the fifth packet is received by the user device (block 445). For example, the user device may generate a sixth packet based on the fifth packet and including information identifying the fifth time, the sixth time, the seventh time, and an eighth time when the fifth packet is received by the user device, as described above.

As further shown in FIG. 4, process 400 may include calculating an uplink unidirectional latency and a downlink unidirectional latency of the primary connection based on the uplink clock offset and the downlink clock offset of the secondary connection and based on the fifth time, the sixth time, the seventh time, and the eighth time (block 450). For example, the user device may calculate an uplink unidirectional latency and a downlink unidirectional latency of the primary connection based on the uplink clock offset and the downlink clock offset of the secondary connection and based on the fifth time, the sixth time, the seventh time, and the eighth time, as described above.

In some implementations, process 400 includes performing one or more actions based on the uplink unidirectional latency and the downlink unidirectional latency of the primary connection. In some implementations, performing the one or more actions includes one or more of providing the uplink unidirectional latency and the downlink unidirectional latency of the primary connection for display, generating an alarm associated with the uplink unidirectional latency or the downlink unidirectional latency of the primary connection, or calculating jitter of the primary connection based on the uplink unidirectional latency and the downlink unidirectional latency of the primary connection.

In some implementations, performing the one or more actions includes determining that the uplink unidirectional latency of the primary connection fails to satisfy a latency threshold, and generating an alarm based on determining that the uplink unidirectional latency of the primary connection fails to satisfy the latency threshold. In some implementations, performing the one or more actions includes determining that the downlink unidirectional latency of the primary connection fails to satisfy a latency threshold, and generating an alarm based on determining that the downlink unidirectional latency of the primary connection fails to satisfy the latency threshold. In some implementations, performing the one or more actions includes allocating one or more additional resources for the primary connection based on the uplink unidirectional latency and the downlink unidirectional latency of the primary connection.

In some implementations, process 400 includes repeating the providing the first packet, the receiving the second packet, and the generating the third packet for a predetermined quantity of times to address errors associated with the round trip time of the secondary connection.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
providing, by a user device, a first packet at a first time to an application via a symmetric connection;
receiving, by the user device, from the application, and via the symmetric connection, a second packet that includes information identifying the first time, a second time when the first packet is received by the application, and a third time when the second packet is transmitted by the application;
generating, by the user device, a third packet based on the second packet and including information identifying the first time, the second time, the third time, and a fourth time when the second packet is received by the user device;
calculating, by the user device, a round trip time of the symmetric connection based on the first time, the second time, the third time, and the fourth time;
calculating, by the user device, an uplink unidirectional latency and a downlink unidirectional latency of the symmetric connection based on the round trip time;
calculating, by the user device, an uplink clock offset and a downlink clock offset of the symmetric connection based on the uplink unidirectional latency of the symmetric connection, the downlink unidirectional latency of the symmetric connection, the first time, the second time, the third time, and the fourth time;
providing, by the user device, a fourth packet, with the uplink clock offset and the downlink clock offset and at a fifth time, to the application via an asymmetric connection;
receiving, by the user device, from the application, and via the asymmetric connection, a fifth packet that includes information identifying the fifth time, a sixth time when the fourth packet is received by the application, and a seventh time when the fifth packet is transmitted by the application;
generating, by the user device, a sixth packet based on the fifth packet and including information identifying the fifth time, the sixth time, the seventh time, and an eighth time when the fifth packet is received by the user device; and
calculating, by the user device, an uplink unidirectional latency and a downlink unidirectional latency of the asymmetric connection based on the uplink clock offset and the downlink clock offset of the symmetric connection and based on the fifth time, the sixth time, the seventh time, and the eighth time.

2. The method of claim 1, further comprising:
performing one or more actions based on the uplink unidirectional latency and the downlink unidirectional latency of the primary asymmetric connection.

3. The method of claim 1, wherein the asymmetric connection includes a radio access network and the symmetric connection includes a wireless access point.

4. The method of claim 1, wherein the third packet includes a first timestamp tuple that includes the first time and the second time, and a second timestamp tuple that includes the third time and the fourth time.

5. The method of claim 1, wherein the second time and the third time are substantially equivalent.

6. The method of claim 1, further comprising:
repeating the providing the first packet, the receiving the second packet, and the generating the third packet for a predetermined quantity of times to address errors associated with the round trip time of the symmetric connection.

7. The method of claim 1, wherein the application is configured to provide one or more multimedia applications to the user device.

8. A user device, comprising:
one or more processors configured to:
provide a first packet at a first time to an application server via a symmetric connection;
receive from the application server, and via the symmetric connection, a second packet that includes information identifying the first time, a second time when the first packet is received by the application server, and a third time when the second packet is transmitted by the application server;
generate a third packet based on the second packet and including information identifying the first time, the second time, the third time, and a fourth time when the second packet is received by the user device;
calculate a round trip time of the symmetric connection based on the first time, the second time, the third time, and the fourth time;
calculate an uplink unidirectional latency and a downlink unidirectional latency of the symmetric connection based on the round trip time;
calculate an uplink clock offset and a downlink clock offset of the symmetric connection based on the uplink unidirectional latency of the symmetric connection, the downlink unidirectional latency of the symmetric connection, the first time, the second time, the third time, and the fourth time;
provide a fourth packet, with the uplink clock offset and the downlink clock offset and at a fifth time, to the application server via an asymmetric connection;
receive from the application server, and via the asymmetric connection, a fifth packet that includes information identifying the fifth time, a sixth time when the fourth packet is received by the application server, and a seventh time when the fifth packet is transmitted by the application server;
generate a sixth packet based on the fifth packet and including information identifying the fifth time, the sixth time, the seventh time, and an eighth time when the fifth packet is received by the user device;
calculate an uplink unidirectional latency and a downlink unidirectional latency of the asymmetric connection based on the uplink clock offset and the downlink clock offset of the symmetric connection and based on the fifth time, the sixth time, the seventh time, and the eighth time; and
perform one or more actions based on the uplink unidirectional latency and the downlink unidirectional latency of the asymmetric connection.

9. The user device of claim 8, wherein the one or more processors, to perform the one or more actions, are configured to one or more of:
provide the uplink unidirectional latency and the downlink unidirectional latency of the asymmetric connection for display;
generate an alarm associated with the uplink unidirectional latency or the downlink unidirectional latency of the asymmetric connection; or
calculate jitter of the asymmetric connection based on the uplink unidirectional latency and the downlink unidirectional latency of the primary asymmetric connection.

10. The user device of claim 8, wherein the one or more processors, to perform the one or more actions, are configured to:
determine that the uplink unidirectional latency of the asymmetric connection fails to satisfy a latency threshold; and
generate an alarm based on determining that the uplink unidirectional latency of the asymmetric connection fails to satisfy the latency threshold.

11. The user device of claim 8, wherein the one or more processors, to perform the one or more actions, are configured to:
determine that the downlink unidirectional latency of the asymmetric connection fails to satisfy a latency threshold; and
generate an alarm based on determining that the downlink unidirectional latency of the asymmetric connection fails to satisfy the latency threshold.

12. The user device of claim 8, wherein the one or more processors, to perform the one or more actions, are configured to:
allocate one or more additional resources for the asymmetric connection based on the uplink unidirectional latency and the downlink unidirectional latency of the asymmetric connection.

13. The user device of claim 8, wherein the application server is a mobile edge computing device.

14. The user device of claim 8, wherein the one or more processors, to calculate the round trip time of the symmetric connection, are configured to:
subtract the first time from the fourth time to obtain a first value;
subtract the second time from the third time to obtain a second value; and
subtract the second value from the first value to calculate the round trip time of the symmetric connection.

15. A non-transitory computer-readable medium storing a set of instructions, the set of instructions comprising:
one or more instructions that, when executed by one or more processors of a user device, cause the user device to:
provide a first packet at a first time to an application server via a symmetric connection;
receive from the application server, and via the symmetric connection, a second packet that includes information identifying the first time, a second time when the first packet is received by the application server, and a third time when the second packet is transmitted by the application server;
generate, based on the second packet, a third packet with a first timestamp tuple that includes the first time and the second time, and a second timestamp tuple that includes the third time and a fourth time when the second packet is received by the user device;
calculate a round trip time of the symmetric connection based on the first time, the second time, the third time, and the fourth time;
calculate an uplink unidirectional latency and a downlink unidirectional latency of the symmetric connection based on the round trip time;
calculate an uplink clock offset and a downlink clock offset of the symmetric connection based on the uplink unidirectional latency of the symmetric connection, the downlink unidirectional latency of the symmetric connection, the first time, the second time, the third time, and the fourth time;
provide a fourth packet, with the uplink clock offset and the downlink clock offset and at a fifth time, to the application server via an asymmetric connection;
receive from the application server, and via the asymmetric connection, a fifth packet that includes information identifying the fifth time, a sixth time when the fourth packet is received by the application server, and a seventh time when the fifth packet is transmitted by the application server;

generate a sixth packet based on the fifth packet and including information identifying the fifth time, the sixth time, the seventh time, and an eighth time when the fifth packet is received by the user device; and calculate an uplink unidirectional latency and a downlink unidirectional latency of the asymmetric connection based on the uplink clock offset and the downlink clock offset of the symmetric connection and based on the fifth time, the sixth time, the seventh time, and the eighth time.

16. The non-transitory computer-readable medium of claim 15, wherein the one or more instructions further cause the user device to:

perform one or more actions based on the uplink unidirectional latency and the downlink unidirectional latency of the asymmetric connection.

17. The non-transitory computer-readable medium of claim 15, wherein the one or more instructions further cause the user device to:

repeat the providing the first packet, the receiving the second packet, and the generating the third packet for a predetermined quantity of times to address errors associated with the round trip time of the symmetric connection.

18. The non-transitory computer-readable medium of claim 15, wherein the one or more instructions further cause the user device to one or more of:

provide the uplink unidirectional latency and the downlink unidirectional latency of the asymmetric connection for display;

generate an alarm associated with the uplink unidirectional latency or the downlink unidirectional latency of the asymmetric connection; or calculate jitter of the asymmetric connection based on the uplink unidirectional latency and the downlink unidirectional latency of the asymmetric connection.

19. The non-transitory computer-readable medium of claim 15, wherein the one or more instructions further cause the user device to:

determine that the uplink unidirectional latency or the downlink unidirectional latency of the asymmetric connection fails to satisfy a latency threshold; and generate an alarm based on determining that the uplink unidirectional latency or the downlink unidirectional latency of the asymmetric connection fails to satisfy the latency threshold.

20. The non-transitory computer-readable medium of claim 15, wherein the one or more instructions, that cause the user device to calculate the round trip time of the symmetric connection, cause the user device to:

subtract the first time from the fourth time to obtain a first value;

subtract the second time from the third time to obtain a second value; and subtract the second value from the first value to calculate the round trip time of the symmetric connection.

* * * * *